(12) United States Patent
Lv et al.

(10) Patent No.: US 9,048,738 B2
(45) Date of Patent: Jun. 2, 2015

(54) SYSTEMS AND METHODS FOR ZERO VOLTAGE SWITCHING IN POWER CONVERSION SYSTEMS

(71) Applicant: ON-BRIGHT ELECTRONICS (SHANGHAI) CO., LTD., Shanghai (CN)

(72) Inventors: Huawei Lv, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/749,493

(22) Filed: Jan. 24, 2013

(65) Prior Publication Data

US 2014/0198539 A1    Jul. 17, 2014

(30) Foreign Application Priority Data

Jan. 15, 2003  (CN) .......................... 2013 1 0014860

(51) Int. Cl.
    *H02M 3/335*     (2006.01)
(52) U.S. Cl.
    CPC ............................... *H02M 3/33507* (2013.01)
    USPC ..................................... 363/21.12; 363/21.04
(58) Field of Classification Search
    USPC ..................... 323/222, 282; 363/21.04, 21.12
    See application file for complete search history.

(56) References Cited

U.S. PATENT DOCUMENTS

| | | | | |
|---|---|---|---|---|
| 5,267,133 | A | * 11/1993 | Motomura et al. | ........ 363/21.03 |
| 5,570,278 | A | * 10/1996 | Cross | .............................. 363/20 |
| 2001/0007530 | A1 | 7/2001 | Hosotani | |
| 2003/0151927 | A1 | 8/2003 | Wittenbreder, Jr. | |
| 2004/0027400 | A1 | * 2/2004 | Ryu et al. | ........................... 347/5 |
| 2006/0187688 | A1 | * 8/2006 | Tsuruya | ..................... 363/56.12 |

FOREIGN PATENT DOCUMENTS

| | | |
|---|---|---|
| CN | 102447413 A | 5/2012 |
| JP | 2005-73391 A | 3/2005 |
| TW | 201135391 | 10/2011 |
| TW | I 382643 | 1/2013 |

OTHER PUBLICATIONS

Chinese Patent Office, Office Action mailed Aug. 1, 2014, in Application No. 201310014860.6.
Taiwan Patent Office, Office Action mailed Sep. 26, 2014, in Application No. 102117551.

* cited by examiner

*Primary Examiner* — Emily P Pham
(74) *Attorney, Agent, or Firm* — Jones Day

(57) ABSTRACT

System and method for regulating a power converter. A system for regulating a power converter includes a controller, a first switch, and a second switch. The controller is configured to generate a first switching signal and a second switching signal. The first switch is configured to receive the first switching signal, the first switch being coupled to an auxiliary winding of the power converter further including a primary winding and a secondary winding. The second switch is configured to receive the second switching signal and coupled to the primary winding of the power converter. The controller is further configured to, change, at a first time, the second switching signal to open the second switch, maintain, from the first time to a second time, the first switching signal to keep the first switch open, and change, at the second time, the first switching signal to close the first switch.

40 Claims, 6 Drawing Sheets

US 9,048,738 B2

SYSTEMS AND METHODS FOR ZERO VOLTAGE SWITCHING IN POWER CONVERSION SYSTEMS

1. CROSS-REFERENCES TO RELATED APPLICATIONS

This application claims priority to Chinese Patent Application No. 201310014860.6, filed Jan. 15, 2013, incorporated by reference herein for all purposes.

2. BACKGROUND OF THE INVENTION

The present invention is directed to integrated circuits. More particularly, the invention provides systems and methods for zero voltage switching. Merely by way of example, the invention has been applied to a power conversion system. But it would be recognized that the invention has a much broader range of applicability.

Modern society faces challenges arising from excessive energy consumption and severe environmental damages. It is highly desirable to promote energy saving and emission reduction. In order to improve energy efficiency of electrical equipments and electronic products, power conversion systems can be optimized to increase power conversion efficiency and lower static stand-by power consumption. In medium-low power applications, the fly-back topology has become one of the most widely used topologies because of its many advantages, such as simple structures, low cost, wide input/output voltage ranges, and small sizes.

Fly-back power conversion systems often implement different operational modes. For example, a fly-back power conversion system can operate in a continuous conduction mode (CCM) and/or a discontinuous conduction mode (DCM). However, the power conversion efficiency of such a power conversion system usually decreases as the operating frequency increases. The switching loss may become a significant problem for a high-density small size switching power supply. In another example, a fly-back power conversion system can operate in a critical conduction mode (CRM) or a quasi-resonant mode (QR).

FIG. 1 is a simplified diagram showing a conventional flyback power conversion system. The power conversion system 100 includes a transformer 102, resistors 104 and 106, capacitors 108, 110 and 114, diodes 116, 118 and 128, a switch 112, and a controller 120. The transformer 102 includes a primary winding 122, a secondary winding 124, and an auxiliary winding 126. For example, the switch 112 is a bipolar junction transistor, a field effect transistor, or an insulated-gate bipolar transistor. The switch 112 includes two terminals 136 and 138. As an example, the primary winding 122 includes a parasitic capacitor 160. In another example, the switch 112 includes a parasitic capacitor 134.

The power conversion system 100 uses the transformer 102 as an inductor capable of storing energy. Also, the transformer 102 isolates an input voltage 130 on the primary side and an output voltage 132 on the secondary side. Thus, the flyback power conversion system 100 usually does not need an output inductor as in a forward structure.

FIG. 2 is a simplified conventional timing diagram for the power conversion system 100 operating in the critical conduction mode (CRM). For example, the critical conduction mode (CRM) is the quasi-resonant mode (QR). The waveform 202 represents a voltage drop of the switch 112 (e.g., the voltage difference between the terminal 136 and the terminal 138) as a function of time, and the waveform 204 represents a current flowing through the primary winding 122 as a function of time. As shown in FIG. 2, during the time period between time $t_1$ and time $t_3$, the switch 112 is open (e.g., off), and during the time period between the time $t_3$ and time $t_4$, the switch 112 is closed (e.g., on). For example, $t_1 \leq t_2 \leq t_3 \leq t_4$.

However, the power conversion system 100 has some disadvantages. For example, when the switch 112 is turned off, the switch 112 may sustain a high voltage stress. The leakage inductance energy often has to be absorbed by one or more extra circuit components, such as the capacitor 110, the resistor 104 and the diode 116. The switching circuit components (e.g., the parasitic capacitor 134 and the inductance of the primary winding 122) often generate resonant waves which may affect electro-magnetic interference (EMI) of the power conversion system 100. In addition, the switching loss wastes energy and may generate excessive heat so as to negatively affect the system safety.

Hence, it is highly desirable to improve techniques for efficiency of switching power conversion systems.

3. BRIEF SUMMARY OF THE INVENTION

The present invention is directed to integrated circuits. More particularly, the invention provides systems and methods for zero voltage switching. Merely by way of example, the invention has been applied to a power conversion system. But it would be recognized that the invention has a much broader range of applicability.

According to one embodiment, a system for regulating a power converter includes a controller, a first switch, and a second switch. The controller is configured to generate a first switching signal and a second switching signal. The first switch is configured to receive the first switching signal, the first switch being coupled to an auxiliary winding of the power converter further including a primary winding and a secondary winding. The second switch is configured to receive the second switching signal and coupled to the primary winding of the power converter. The controller is further configured to, change, at a first time, the second switching signal to open the second switch, maintain, from the first time to a second time, the first switching signal to keep the first switch open, and change, at the second time, the first switching signal to close the first switch. The controller is further configured to, change, at a third time, the first switching signal to open the first switch, maintain, from the third time to a fourth time, the second switching signal to keep the second switch open, and change, at the fourth time, the second switching signal to close the second switch.

According to another embodiment, a system for regulating a power converter includes a controller, a first switch, and a second switch. The controller is configured to generate a first switching signal and a second switching signal. The first switch is configured to receive the first switching signal, the first switch being coupled to a first capacitor and an auxiliary winding of the power converter, the power conversation system further including a primary winding and a secondary winding. The second switch is configured to receive the second switching signal and coupled to the primary winding of the power converter, the second switch being associated with a second capacitor, the primary winding being associated with a third capacitor. The controller is further configured to, charge, from a first time to a second time, the first capacitor in response to a first current flowing through the first switch, discharge, from the second time to a third time, the first capacitor to generate a second current flowing through the first switch, maintain, from the first time to the third time, the first switching signal to keep the first switch closed, and maintain, from the first time to the third time, the second switching signal to keep the second switch open. The controller is further configured to, change, at the third time, the first switching signal to open the first switch, discharge, from the third time to a fourth time, the second capacitor and the third capacitor to generate a third current flowing through the primary winding, and maintain, from the third time to the fourth time, the second switching signal to keep the second switch open.

According to yet another embodiment, a system for regulating a power converter includes a controller configured to generate a first switching signal and a second switching signal, send the first switching signal to a first switch, and send the second switching signal to a second switch, the first switch being coupled to an auxiliary winding of the power converter further including a primary winding and a secondary winding, the second switch being coupled to the primary winding. The controller is further configured to, change, at a first time, the second switching signal to open the second switch, maintain, from the first time to a second time, the first switching signal to keep the first switch open, and change, at the second time, the first switching signal to close the first switch. The controller is further configured to, change, at a third time, the first switching signal to open the first switch, maintain, from the third time to a fourth time, the second switching signal to keep the second switch open, and change, at the fourth time, the second switching signal to close the second switch.

According to yet another embodiment, a system for regulating a power converter includes a controller configured to generate a first switching signal and a second switching signal, send the first switching signal to a first switch, and send the second switching signal to a second switch, the first switch being coupled to a first capacitor and an auxiliary winding of the power converter, the power converter further including a primary winding and a secondary winding, the second switch being coupled to the primary winding and associated with a second capacitor, the primary winding being associated with a third capacitor. The controller is further configured to, charge, from a first time to a second time, the first capacitor in response to a first current flowing through the first switch, discharge, from the second time to a third time, the first capacitor to generate a second current flowing through the first switch, maintain, from the first time to the third time, the first switching signal to keep the first switch closed, and maintain, from the first time to the third time, the second switching signal to keep the second switch open. The controller is further configured to, change, at the third time, the first switching signal to open the first switch, discharge, from the third time to a fourth time, the second capacitor and the third capacitor to generate a third current flowing through the primary winding, and maintain, from the third time to the fourth time, the second switching signal to keep the second switch open.

According to yet another embodiment, a system for regulating a power converter includes a signal generator configured to output a first switching signal to a first switch and a second switching signal to a second switch, the first switch being coupled to an auxiliary winding of a power converter, the second switch including a first switch terminal and a second switch terminal and being coupled to a primary winding of the power converter, the power converter further including a secondary winding. The signal generator is further configured to, maintain, from a first time to a second time, the first switching signal to keep the first switch closed, change, at the second time, the first switching signal to open the first switch, maintain, from the first time to a third time, the second switching signal to keep the second switch open, the third time being no earlier than the second time, and if a difference between a first voltage of the first switch terminal and a second voltage of the second switch terminal becomes zero at the third time, change the second switching signal to close the second switch.

In one embodiment, a method for regulating a power converter includes, generating a first switching signal and a second switching signal, sending the first switching signal to a first switch coupled to an auxiliary winding of a power converter, and sending the second switching signal to a second switch coupled to a primary winding of the power converter further including a secondary winding. The method further includes changing, at a first time, the second switching signal to open the second switch, maintaining, from the first time to a second time, the first switching signal to keep the first switch open, and changing, at the second time, the first switching signal to close the first switch. In addition, the method includes changing, at a third time, the first switching signal to open the first switch, maintaining, from the third time to a fourth time, the second switching signal to keep the second switch open, and changing, at the fourth time, the second switching signal to close the second switch.

In another embodiment, a method for regulating a power converter includes, generating a first switching signal and a second switching signal, sending the first switching signal to a first switch coupled to a first capacitor and an auxiliary winding of a power converter, the power converter further including a primary winding and a secondary winding, and sending the second switching signal to a second switch coupled to the primary winding of the power converter, the second switch being associated with a second capacitor, the primary winding being associated with a third capacitor. The method further includes charging, from a first time to a second time, the first capacitor in response to a first current flowing through the first switch, discharging, from the second time to a third time, the first capacitor to generate a second current flowing through the first switch, and maintaining, from the first time to the third time, the first switching signal to keep the first switch closed. In addition, the method includes maintaining, from the first time to the third time, the second switching signal to keep the second switch open, changing, at the third time, the first switching signal to open the first switch, discharging, from the third time to a fourth time, the second capacitor and the third capacitor to generate a third current flowing through the primary winding, and maintaining, from the third time to the fourth time, the second switching signal to keep the second switch open.

In yet another embodiment, a method for regulating a power converter includes, generating a first switching signal to a first switch and a second switching signal to a second switch, the first switch being coupled to an auxiliary winding of a power converter, the second switch including a first switch terminal and a second switch terminal and being coupled to a primary winding of the power converter, the power converter further including a secondary winding, maintaining, from a first time to a second time, the first switching signal to keep the first switch closed, and changing, at the second time, the first switching signal to open the first switch. Further, the method includes maintaining, from the first time to a third time, the second switching signal to keep the second switch open, the third time being no earlier than the second time, and if a difference between a first voltage of the first switch terminal and a second voltage of the second switch terminal becomes zero at the third time, changing the second switching signal to close the second switch.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for low voltage switching. Merely by way of example, the invention has been applied to a power conversion system. But it would be recognized that the invention has a much broader range of applicability.

Figure 1:
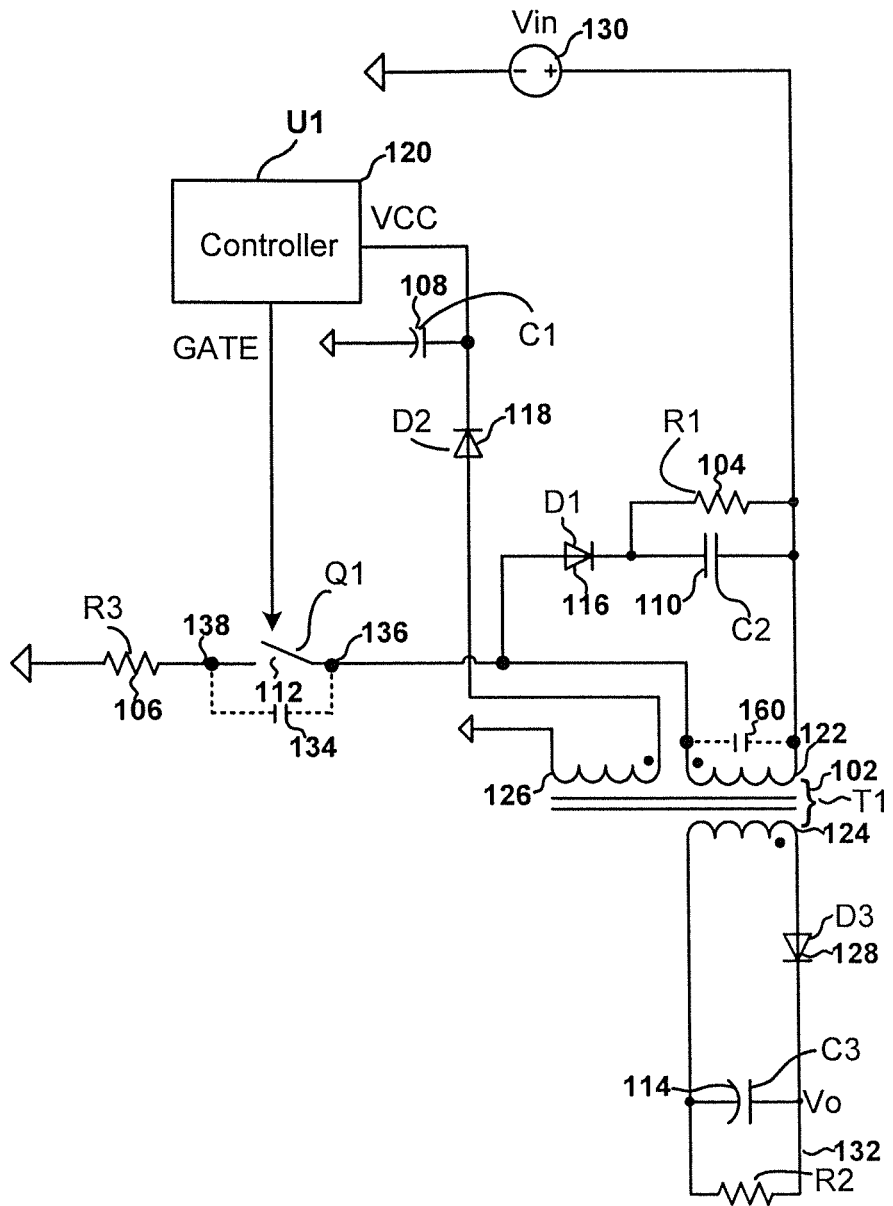
FIG. 1 is a simplified diagram showing a conventional flyback power conversion system.
Figure 2:
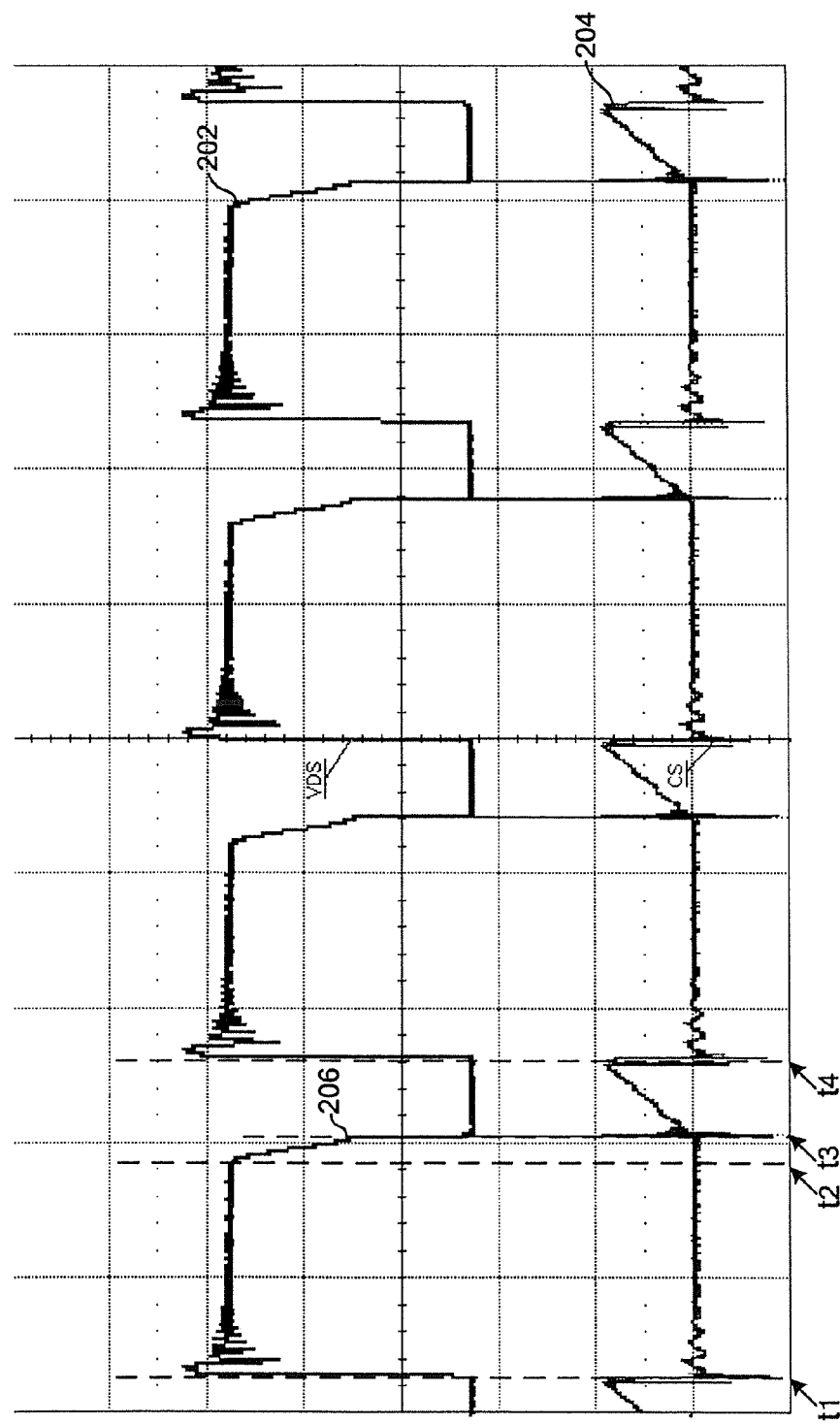
FIG. 2 is a simplified conventional timing diagram for the power conversion system as shown in FIG. 1 operating in the critical conduction mode (CRM).

Referring back to FIG. 1 and FIG. 2, the power conversion system 100 operates in the QR mode. A demagnetization process associated with the transformer 102 occurs between the time $t_1$ and time $t_2$. For example, at the time $t_2$, the demagnetization process is completed, and the energy stored in the parasitic capacitors 134 and 160 and the inductance of the primary winding 122 causes LC resonance. The voltage drop of the switch 112 decreases in magnitude (e.g., as shown by the waveform 202). At the time $t_3$, the voltage drop of the switch 112 decreases to a magnitude 206, and the switch 112 is closed (e.g., being turned on).

The magnitude 206 can be determined to be equal to ($V_{in}$–n×$V_o$), without taking into account the voltage drop at the diode 128, where $V_{in}$ represents the input voltage 130, $V_o$ represents an output voltage 132, and n represents a turns ratio between the primary winding 122 and the secondary winding 124. For example, the voltage drop at the diode 128 is very small and can be ignored. Often $V_{in}$ is larger than n×$V_o$, and thus when the switch 112 is turned on the magnitude 206 is not zero which results in a switching loss. In order to reduce the switching loss and obtain a higher operating frequency, a zero voltage switching scheme is proposed herein.

Figure 3:
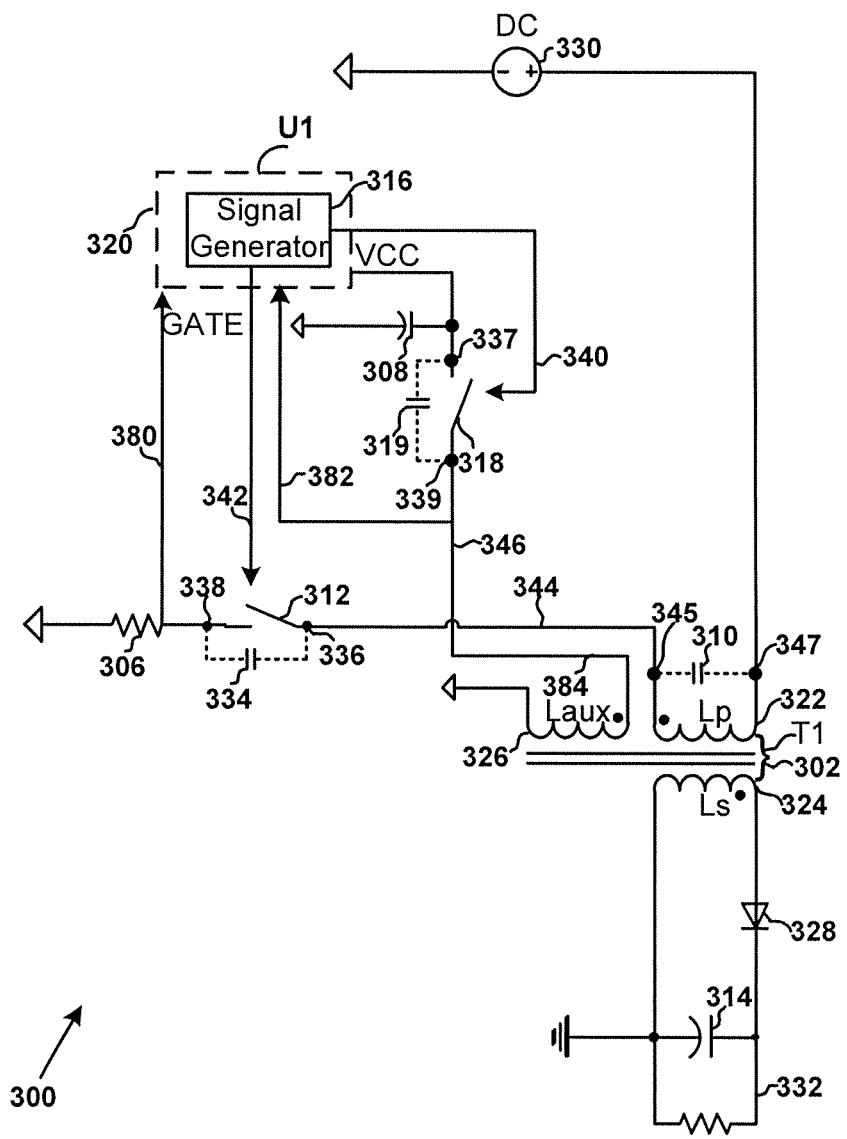
FIG. 3 is a simplified diagram showing a fly-back power conversion system according to an embodiment of the present invention.

FIG. 3 is a simplified diagram showing a fly-back power conversion system according to an embodiment of the present invention. This diagram is merely an example, which should not unduly limit the scope of the claims. One of ordinary skill in the art would recognize many variations, alternatives, and modifications. The power conversion system 300 (i.e., a power converter) includes a transformer 302, a resistor 306, capacitors 308 and 314, a diode 328, switches 312 and 318, and a controller 320. The transformer 302 includes a primary winding 322, a secondary winding 324, and an auxiliary winding 326. The controller 320 includes a signal generator 316. Moreover, the power conversion system 300 further includes capacitors 310, 319, and 334 according to certain embodiments.

For example, the signal generator 316 includes one or more components, such as a NOT gate. In another example, the switch 312 is a transistor (e.g., a bipolar junction transistor, a field effect transistor, or an insulated-gate bipolar transistor). In yet another example, the switch 318 is a transistor (e.g., a bipolar junction transistor, a field effect transistor, or an insulated-gate bipolar transistor). In yet another example, the switch 312 includes two terminals 336 and 338, and the switch 318 includes two terminals 337 and 339.

In one embodiment, the capacitor 310 is connected in parallel to the primary winding 322. For example, the capacitor 310 includes a parasitic capacitor of the primary winding 322 and an external capacitor. In another example, the capacitor 310 includes only the parasitic capacitor of the primary winding 322. In another embodiment, the capacitor 319 is connected in parallel to the switch 318. For example, the capacitor 319 includes a parasitic capacitor of the switch 318 and an external capacitor. In another example, the capacitor 319 includes only the parasitic capacitor of the switch 318. In yet another embodiment, the capacitor 334 is connected in parallel to the switch 312. For example, the capacitor 334 includes a parasitic capacitor of the switch 312 and an external capacitor. In another example, the capacitor 334 includes only the parasitic capacitor of the switch 312.

As shown in FIG. 3, the controller 320 receives a current sensing signal 380 associated with a primary current flowing through the primary winding 322, and a detection signal 382 associated with a voltage signal 384 of the auxiliary winding 326 in some embodiments. For example, the detection signal 382 indicates whether the voltage signal 384 reaches zero. The signal generator 316 generates signals 342 and 340 to turn on and off the switches 312 and 318 respectively in certain embodiments. For example, based on the current sensing signal 380 and the detection signal 382, the controller 320 determines whether a voltage drop between the terminals 336 and 338 (e.g., $V_{DS}$) of the switch 312 approaches zero. In another example, if the voltage drop between the terminals 336 and 338 (e.g., $V_{DS}$) approaches zero, the signal generator 316 changes the signal 342 to close (e.g., to turn on) the switch 312 and a primary current 344 flows through the primary winding 322. In yet another example, when the current 344 increases to reach a predetermined magnitude, the signal generator 316 changes the signal 342 to open (e.g., to turn off) the switch 312. As described above, zero voltage switching of the switch 312 is, for example, when the switch 312 changes from being turned off to being turned on, the voltage drop between the terminals 336 and 338 (e.g., $V_{DS}$) is equal to zero or substantially equal to zero, according to certain embodiments.

As discussed above and further emphasized here, FIG. 3 is merely an example, which should not unduly limit the scope of the claims. One of ordinary skill in the art would recognize many variations, alternatives, and modifications. For example, if the capacitor 310 includes the parasitic capacitor of the primary winding 322 and an external capacitor, the capacitor 310 is partially part of the primary winding 322. In another example, if the capacitor 310 includes only the parasitic capacitor of the primary winding 322, the capacitor 310 is completely part of the primary winding 322.

In yet another example, if the capacitor 319 includes the parasitic capacitor of the switch 318 and an external capacitor, the capacitor 319 is partially part of the switch 318. In yet another example, if the capacitor 319 includes only the parasitic capacitor of the switch 318, the capacitor 319 is completely part of the switch 318. In yet another example, if the capacitor 334 includes the parasitic capacitor of the switch 312 and an external capacitor, the capacitor 334 is partially part of the switch 312. In yet another example, if the capacitor 334 includes only the parasitic capacitor of the switch 312, the capacitor 334 is completely part of the switch 312.

Figure 4:
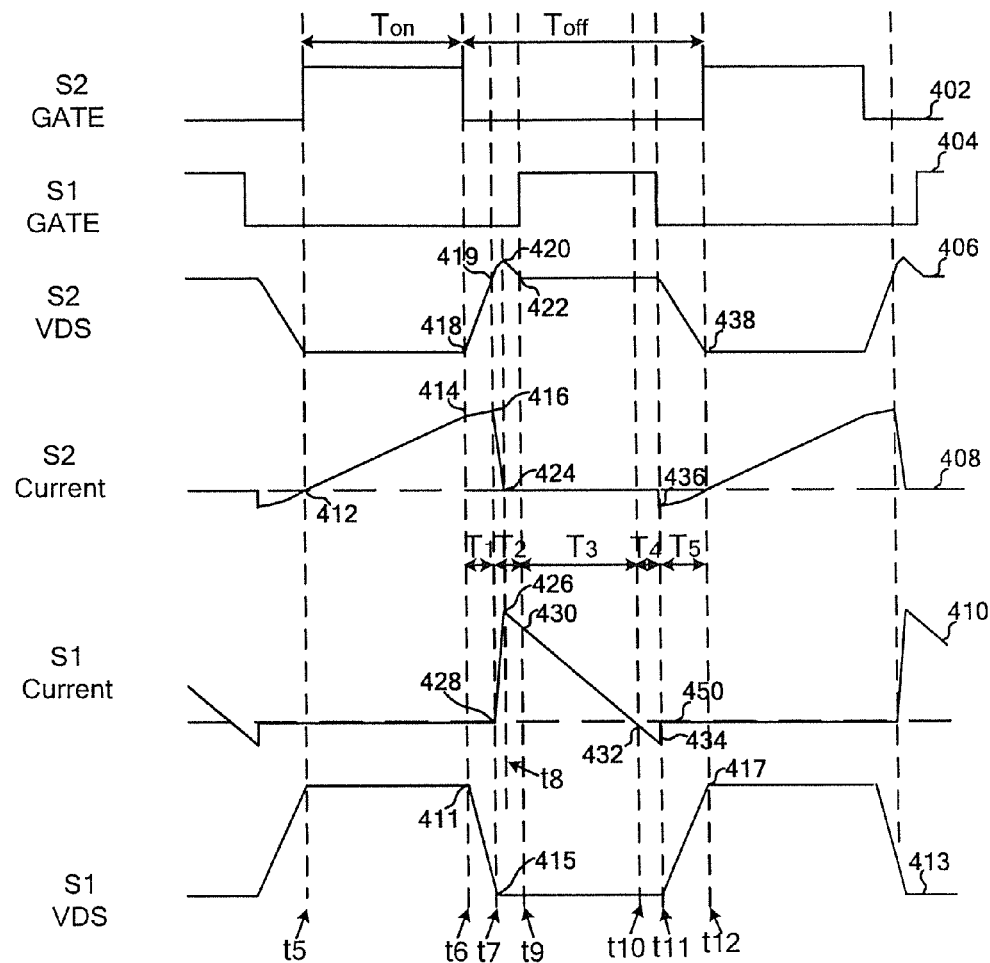
FIG. 4 is a simplified timing diagram for the power conversion system as shown in FIG. 3 operating in the critical conduction mode (CRM) with zero voltage switching (ZVS) according to an embodiment of the present invention.

FIG. 4 is a simplified timing diagram for the power conversion system 300 operating in the critical conduction mode (CRM) with zero voltage switching (ZVS) according to an embodiment of the present invention. This diagram is merely an example, which should not unduly limit the scope of the claims. One of ordinary skill in the art would recognize many variations, alternatives, and modifications. The waveform 402 represents the signal 342 associated with the switch 312 as a function of time, the waveform 404 represents the signal 340 associated with the switch 318 as a function of time, the waveform 406 represents a voltage drop of the switch 312 (e.g., the voltage difference between the terminal 336 and the terminal 338) as a function of time, the waveform 408 represents the primary current 344 flowing through the primary winding 322 as a function of time, the waveform 410 represents a current 346 flowing through the auxiliary winding 326 as a function of time, and the waveform 413 represents a voltage drop of the switch 318 (e.g., the voltage difference between the terminal 337 and the terminal 339). For example, the waveform 408 represents both the direction and the magnitude of the primary current 344.

For example, the critical conduction mode (CRM) is the quasi-resonant mode (QR). In another example, an on-time period, $T_{on}$, starts at time $t_5$ and ends at time $t_6$, and an off-time period, $T_{off}$, starts at the time $t_6$ and ends at time $t_{12}$. In yet another example, the off-time period $T_{off}$ includes five time periods, $T_1$, $T_2$, $T_3$, $T_4$ and $T_5$. In yet another example, the time period $T_1$ starts at the time $t_6$ and ends at time $t_7$, the time period $T_2$ starts at the time $t_7$ and ends at time $t_9$, and the time period $T_3$ starts at the time $t_9$ and ends at time $t_{10}$. In yet another example, the time period $T_4$ starts at the time $t_{10}$ and ends at time $t_{11}$ and the time period $T_5$ starts at the time $t_{11}$ and ends at the time $t_{12}$. In yet another example, $t_5 \leq t_6 \leq t_7 \leq t_8 \leq t_9 \leq t_{10} \leq t_{11} \leq t_{12}$.

As shown in FIG. 3 and FIG. 4, during the on-time period $T_{on}$, the signal 342 associated with the switch 312 is at a logic high level (e.g., as shown by the waveform 402) and in response the switch 312 is closed (e.g., on) according to one embodiment. For example, the current 344 flowing through the primary winding 322 increases from a magnitude 412 (e.g., at $t_5$) to a magnitude 414 (e.g., at $t_6$) as shown by the waveform 408. In another example, at $t_6$, the voltage signal 342 changes from the logic high level to a logic low level (e.g., as shown by the waveform 402), and in response the switch 312 is open (e.g., off).

According to another embodiment, at the beginning of the time period $T_1$ (e.g., at $t_6$), a demagnetization process associated with the transformer 302 begins. For example, during the time period $T_1$, the current 344 flowing through the primary winding 322 continues to increase from the magnitude 414 (e.g., at $t_6$) to a magnitude 416 (e.g., at $t_7$), and charges the capacitor 310 and the capacitor 334. In another example, the current 344 increases at a lower rate during the time period $T_1$ than during the time period $T_{on}$ (e.g., as shown by the waveform 408), and flows from the primary winding 322 to the switch 312. In yet another example, the voltage drop on the switch 312 (e.g., the voltage difference between the terminal 336 and the terminal 338) increases from a magnitude 418 (e.g., at $t_6$) to a magnitude 419 (e.g., at $t_7$) as shown by the waveform 406. In yet another example, during the time period $T_1$, the signal 340 associated with the switch 318 keeps at a logic low level (e.g., as shown by the waveform 404). In yet another example, the voltage drop of the switch 318 decreases from a magnitude 411 to a magnitude 415 (e.g., as shown by the waveform 413).

According to yet another embodiment, during the time period $T_2$, the voltage drop on the switch 312 (e.g., the voltage difference between the terminal 336 and the terminal 338) continues to increase to a peak magnitude 420 (e.g., at $t_8$), and then decreases to a magnitude 422 (e.g., at $t_9$). For example, the magnitude 422 is approximately equal to $V_{in} + n \times V_o$, without taking into consideration the voltage drop at the diode 328, where $V_{in}$ represents an input voltage 330, $V_o$ represents an output voltage 332, and n represents a turns ratio between the primary winding 322 and the secondary winding 324. For example, the voltage drop of the diode 328 is very small and can be ignored. In another example, the current 344 decreases from the magnitude 416 (e.g., at $t_7$) to a magnitude 424 (e.g., zero at $t_8$), and then keeps at the magnitude 424 during the rest of the time period $T_2$ (e.g., as shown by the waveform 408). During the time period $T_2$, currents begin to flow in the secondary winding 324 and the auxiliary winding 326 in some embodiments. For example, the current 346 flowing through the auxiliary winding 326 increases from a magnitude 428 (e.g., zero at $t_7$) to a magnitude 426 (e.g., at $t_8$), and then decreases to a magnitude 430 (e.g., at $t_9$). In another example, the current 346 flows from the auxiliary winding 326 to the switch 318.

In one embodiment, at the beginning of the time period $T_3$, the signal 340 associated with the switch 318 changes from a logic low level to a logic high level (e.g., as shown by the waveform 404). For example, in response the switch 318 is closed (e.g., being turned on), and the voltage drop between the terminals 337 and 339 of the switch 318 is nearly zero. As such, a zero-voltage turn-on of the switch 318 (e.g., zero voltage switching of the switch 318) is achieved in certain embodiments. For example, during the time period $T_3$, the current 346 flowing through the auxiliary winding 326 continues to decrease from the magnitude 430 (e.g., at $t_9$) to a magnitude 432 (e.g., zero at $t_{10}$). In another example, the capacitor 308 is charged by the current 346 during the time period $T_3$.

In another embodiment, during the time period $T_4$, the current 344 flowing through the primary winding 322 keeps at the magnitude 424 (e.g., zero) as shown by the waveform 408. For example, the demagnetization process associated with the transformer 302 ends. In another example, the diode 328 is reverse-biased, and the current flowing through the secondary winding 324 decreases in magnitude (e.g., to zero). In yet another example, the voltage drop on the switch 312 (e.g., the voltage difference between the terminal 336 and the terminal 338) keeps at the magnitude 422 (e.g., as shown by the waveform 406). In yet another example, the current 346 flowing through the auxiliary winding 326 reverses direction (e.g., from the switch 318 to the auxiliary winding 326), and increases in magnitude (e.g., as shown by the negative magnitude of the waveform 410). In yet another example, the capacitor 308 is discharged to sustain the reversed current 346. In yet another example, the capacitor 308 has a large capacitance, and when the capacitor 308 is discharged during the time period $T_4$, the voltage drop on the capacitor 308 does not change much. In yet another example, during the time periods $T_3$ and $T_4$, the voltage drop of the switch 318 keeps at the magnitude 415 (e.g., zero as shown by the waveform 413).

In yet another embodiment, at the beginning of the time period $T_5$ (e.g., at $t_{11}$), the current 346 increases to a magnitude 434 which is larger than or equal to a threshold. For example, the signal 340 associated with the switch 318 changes from the logic high level to the logic low level (e.g., as shown by the waveform 404), and in response the switch 318 is open (e.g., off). In another example, the current 346 flowing through the auxiliary winding 326 (e.g., from the switch 318 to the auxiliary winding 326) decreases to a low magnitude 450 (e.g., zero at $t_{11}$ as shown by the waveform 410). In yet another example, the current 344 flowing through the primary winding 322 (e.g., the primary winding of a flyback transformer) reverses direction (e.g., flowing from a node 345 to another node 347 of the primary winding 322) and increases to a magnitude 436 (e.g., at $t_{11}$ as shown by the waveform 408). In yet another example, the current 344 corresponds to a current component associated with the capacitor 310 (e.g., from the node 347 to the node 345) and another current component associated with the capacitor 334 (e.g., from the terminal 336 to the node 345) which discharges the capacitor 334. In yet another example, at the beginning of the time period $T_5$ (e.g., at $t_{11}$), the voltage drop on the capacitor 334 (e.g., the magnitude 422) is larger than the input voltage 330 in magnitude, and the capacitor 310 is negatively biased so that the voltage at the node 345 is higher than the voltage at the node 347. In yet another example, during the time period $T_5$, the capacitor 334 and the capacitor 310 are discharged over time, and the voltage drop on the switch 312 (e.g., the voltage difference between the terminal 336 and the terminal 338) decreases from the magnitude 422 (e.g., at $t_{11}$) to a magnitude 438 (e.g., zero at $t_{12}$) as shown by the waveform 406. In yet another example, the current 344 decreases in magnitude to a low magnitude (e.g., zero at $t_{12}$). In yet another example, during the time period $T_5$, the voltage drop of the switch 318 increases to a magnitude 417 (e.g., as shown by the waveform 413). In yet another example, the magnitude 417 is equal to the magnitude 411. In yet another example, at the end of the time period $T_5$ (e.g., at $t_{12}$), the voltage of the node 345 becomes equal to a chip ground (e.g., zero), and the voltage drop on the capacitor 310 becomes equal to or approximately equal to the input voltage 330 in magnitude.

In yet another embodiment, the energy stored in the primary winding 322 can be determined as follows:

$$E_p = \frac{1}{2} \times i_p^2 \times L_p \quad \text{(Equation 1)}$$

where $i_p$ represents the current 344 flowing through the primary winding 322, and $L_p$ represents the inductance of the primary winding 322. As an example, the energy stored in the capacitor 310 and the capacitor 334 can be determined as follows:

$$E_c = \frac{1}{2} \times (C_2 + C_4) \times V_4^2 \quad \text{(Equation 2)}$$

where $C_2$ represents the capacitance of the capacitor 310, $C_4$ represents the capacitance of the capacitor 334, and $V_4$ represents the voltage drop on the capacitor 334. For example, if the energy stored in the primary winding (e.g., $E_p$) is larger or equal to the energy stored in the capacitor 310 and the capacitor 334 (e.g., $E_c$), then the capacitor 334 and the capacitor 310 can be completely discharged (e.g., to a zero voltage) during the time period $T_5$. As such, the zero voltage switching of the switch 312 can be achieved according to certain embodiments. For example, at the end of the time period $T_5$ (e.g., at $t_{12}$), the signal 342 associated with the switch 312 changes from the logic low level to the logic high level (e.g., as shown by the waveform 402), and in response the switch 312 is closed (e.g., on). In another example, the voltage drop on the switch 312 (e.g., the voltage difference between the terminal 336 and the terminal 338) remains at the magnitude 438 (e.g., zero at $t_{12}$) as shown by the waveform 406.

As shown in FIG. 4, the waveform 408 represents the current 344 as a function of time. For example, as shown in FIG. 3, the capacitor 334 is connected in parallel with the switch 312, and the current 344 flows from or to the combination of the switch 312 and the capacitor 334. In another example, the capacitor 334 is either partially or completely part of the switch 312. Also as shown in FIG. 4, the waveform 410 represents the current 346 as a function of time. For example, as shown in FIG. 3, the capacitor 319 is connected in parallel with the switch 318, and the current 346 flows from or to the combination of the switch 318 and the capacitor 319. In another example, the capacitor 319 is either partially or completely part of the switch 312.

As discussed above and further emphasized here, FIG. 3 and FIG. 4 are merely examples, which should not unduly limit the scope of the claims. One of ordinary skill in the art would recognize many variations, alternatives, and modifications. According to one embodiment, the capacitor 334 is a combination of an external capacitor and the parasitic capacitor of the switch 312. For example, the external capacitor is connected in parallel with the parasitic capacitor of the switch 312. According to another embodiment, the capacitor 310 is a combination of an external capacitor and the parasitic capacitor of the primary winding 322. For example, the external capacitor is connected in parallel with the parasitic capacitor of the primary winding 322.

Figure 5:
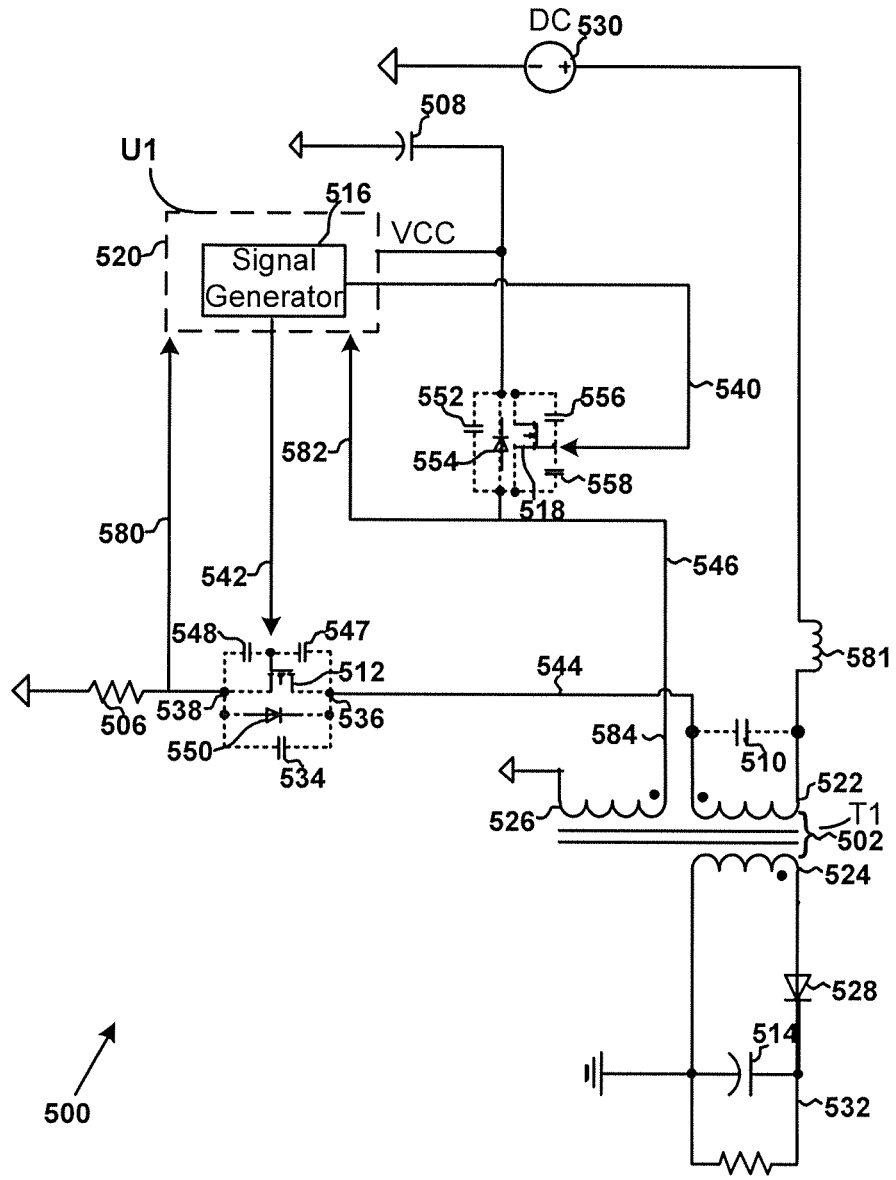
FIG. 5 is a simplified diagram showing a fly-back power conversion system according to another embodiment of the present invention.

FIG. 5 is a simplified diagram showing a fly-back power conversion system according to another embodiment of the present invention. This diagram is merely an example, which should not unduly limit the scope of the claims. One of ordinary skill in the art would recognize many variations, alternatives, and modifications. The power conversion system 500 (i.e., a power converter) includes a transformer 502, a resistor 506, capacitors 508 and 514, a diode 528, transistors 512 and 518, and a controller 520. The transformer 502 includes a primary winding 522, a secondary winding 524, an auxiliary winding 526 and a parasitic leakage inductor 581. The controller 520 includes a signal generator 516.

For example, the signal generator 516 includes one or more components, such as a NOT gate. In another example, the transistor 512 is a field effect transistor. In yet another example, the transistor 518 is a field effect transistor. In yet another example, the transistor 512 includes a terminal 536 (e.g., drain terminal) and a terminal 538 (e.g., source terminal). In yet another example, a capacitor 510 connected in parallel to the primary winding 522 includes the parasitic capacitance of the primary winding 522. In yet another example, capacitors 534, 547 and 548 and a diode 550 are parasitic components of the transistor 512. In yet another example, capacitors 552, 556 and 558 and a diode 554 are parasitic components of the transistor 518. In yet another example, the capacitors 534 and/or the capacitor 510 further include external capacitors for reducing the turn-off voltage of the transistor 512. In yet another example, the power conversion system 500 is the same as the power conversion system 300. In yet another example, the controller 520 is the same as the controller 320. In yet another example, the signal generator 516 is the same as the signal generator 316. The controller 520 receives a current sensing signal 580 associated with a primary current flowing through the primary winding 522, and a detection signal 582 associated with a voltage signal 584 of the auxiliary winding 526 in some embodiments.

The simplified timing diagram shown in FIG. 4 is also applicable to the power conversion system 500 according to another embodiment of the present invention. For example, the waveform 402 represents a gate voltage signal 542 applied on the transistor 512 as a function of time, the waveform 404 represents a gate voltage signal 540 applied on the transistor

518 as a function of time, the waveform 406 represents a drain-source voltage drop of the transistor 512 (e.g., the voltage difference between the terminal 536 and the terminal 538) as a function of time, the waveform 408 represents a current 544 flowing through the primary winding 522 as a function of time, and the waveform 410 represents a current 546 flowing through the auxiliary winding 526 as a function of time. In another example, the operation of the power conversion system 500 according to FIG. 4 is similar to the operation of the power conversion system 300 according to FIG. 4 as described above.

Figure 6:
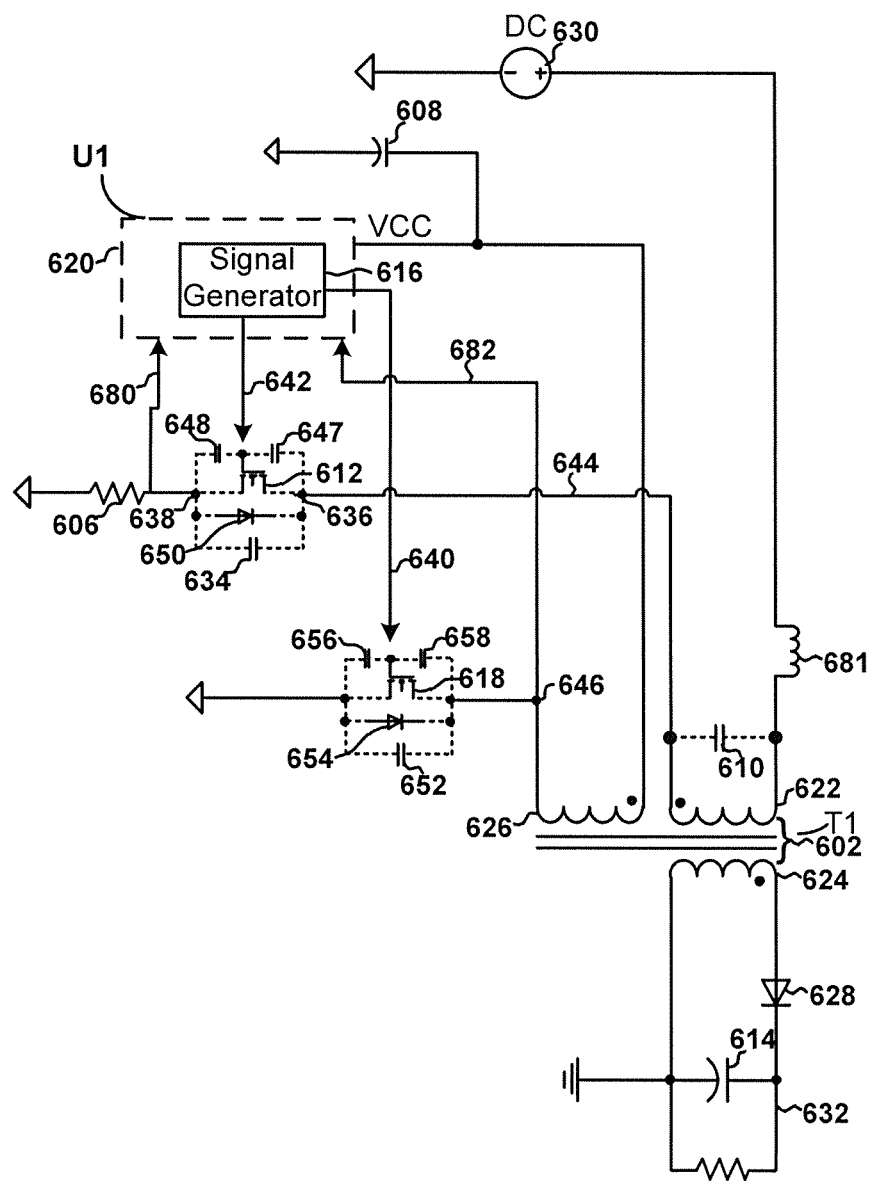
FIG. 6 is a simplified diagram showing a fly-back power conversion system according to yet another embodiment of the present invention.

FIG. 6 is a simplified diagram showing a fly-back power conversion system according to yet another embodiment of the present invention. This diagram is merely an example, which should not unduly limit the scope of the claims. One of ordinary skill in the art would recognize many variations, alternatives, and modifications. The power conversion system 600 (i.e., a power converter) includes a transformer 602, a resistor 606, capacitors 608 and 614, a diode 628, transistors 612 and 618, and a controller 620. The transformer 602 includes a primary winding 622, a secondary winding 624, an auxiliary winding 626 and a parasitic leakage inductor 681. The controller 620 includes a signal generator 616.

For example, the signal generator 616 includes one or more components, such as a NOT gate. In another example, the transistor 612 is a field effect transistor. In yet another example, the transistor 618 is a field effect transistor. In yet another example, the transistor 612 includes a terminal 636 (e.g., drain terminal) and a terminal 638 (e.g., source terminal). In yet another example, a capacitor 610 connected in parallel to the primary winding 622 includes the parasitic capacitance of the primary winding 622. In yet another example, capacitors 634, 647 and 648 and a diode 650 are parasitic components of the transistor 612. In yet another example, capacitors 652, 656 and 658 and a diode 654 are parasitic components of the transistor 618. In yet another example, the capacitors 634 and/or the capacitor 610 further include additional capacitors for reducing the turn-off voltage of the transistor 612. In yet another example, the controller 620 is the same as the controller 320. In yet another example, the signal generator 616 is the same as the signal generator 316. The controller 620 receives a current sensing signal 680 associated with a primary current flowing through the primary winding 622, and a detection signal 682 associated with the auxiliary winding 626 in some embodiments.

The simplified timing diagram shown in FIG. 4 is also applicable to the power conversion system 600 according to another embodiment of the present invention. For example, the waveform 402 represents a gate voltage signal 642 applied on the transistor 612 as a function of time, the waveform 404 represents a gate voltage signal 640 applied on the transistor 618 as a function of time, the waveform 406 represents a drain-source voltage drop of the transistor 612 (e.g., the voltage difference between the terminal 636 and the terminal 638) as a function of time, the waveform 408 represents a current 644 flowing through the primary winding 622 as a function of time, and the waveform 410 represents a current 646 flowing through the auxiliary winding 626 as a function of time.

According to another embodiment, a system for regulating a power converter includes a controller, a first switch, and a second switch. The controller is configured to generate a first switching signal and a second switching signal. The first switch is configured to receive the first switching signal, the first switch being coupled to an auxiliary winding of the power converter further including a primary winding and a secondary winding. The second switch is configured to receive the second switching signal and coupled to the primary winding of the power converter. The controller is further configured to, change, at a first time, the second switching signal to open the second switch, maintain, from the first time to a second time, the first switching signal to keep the first switch open, and change, at the second time, the first switching signal to close the first switch. The controller is further configured to, change, at a third time, the first switching signal to open the first switch, maintain, from the third time to a fourth time, the second switching signal to keep the second switch open, and change, at the fourth time, the second switching signal to close the second switch. For example, the system is implemented according to FIG. 3, FIG. 4, FIG. 5 and/or FIG. 6.

According to yet another embodiment, a system for regulating a power converter includes a controller, a first switch, and a second switch. The controller is configured to generate a first switching signal and a second switching signal. The first switch is configured to receive the first switching signal, the first switch being coupled to a first capacitor and an auxiliary winding of the power converter, the power conversation system further including a primary winding and a secondary winding. The second switch is configured to receive the second switching signal and coupled to the primary winding of the power converter, the second switch being associated with a second capacitor, the primary winding being associated with a third capacitor. The controller is further configured to, charge, from a first time to a second time, the first capacitor in response to a first current flowing through the first switch, discharge, from the second time to a third time, the first capacitor to generate a second current flowing through the first switch, maintain, from the first time to the third time, the first switching signal to keep the first switch closed, and maintain, from the first time to the third time, the second switching signal to keep the second switch open. The controller is further configured to, change, at the third time, the first switching signal to open the first switch, discharge, from the third time to a fourth time, the second capacitor and the third capacitor to generate a third current flowing through the primary winding, and maintain, from the third time to the fourth time, the second switching signal to keep the second switch open. For example, the system is implemented according to FIG. 3, FIG. 4, FIG. 5 and/or FIG. 6.

According to yet another embodiment, a system for regulating a power converter includes a controller configured to generate a first switching signal and a second switching signal, send the first switching signal to a first switch, and send the second switching signal to a second switch, the first switch being coupled to an auxiliary winding of the power converter further including a primary winding and a secondary winding, the second switch being coupled to the primary winding. The controller is further configured to, change, at a first time, the second switching signal to open the second switch, maintain, from the first time to a second time, the first switching signal to keep the first switch open, and change, at the second time, the first switching signal to close the first switch. The controller is further configured to, change, at a third time, the first switching signal to open the first switch, maintain, from the third time to a fourth time, the second switching signal to keep the second switch open, and change, at the fourth time, the second switching signal to close the second switch. For example, the system is implemented according to FIG. 3, FIG. 4, FIG. 5 and/or FIG. 6.

According to yet another embodiment, a system for regulating a power converter includes a controller configured to generate a first switching signal and a second switching signal, send the first switching signal to a first switch, and send the second switching signal to a second switch, the first switch being coupled to a first capacitor and an auxiliary winding of the power converter, the power converter further including a primary winding and a secondary winding, the second switch being coupled to the primary winding and associated with a second capacitor, the primary winding being associated with a third capacitor. The controller is further configured to, charge, from a first time to a second time, the first capacitor in response to a first current flowing through the first switch, discharge, from the second time to a third time, the first capacitor to generate a second current flowing through the first switch, maintain, from the first time to the third time, the first switching signal to keep the first switch closed, and maintain, from the first time to the third time, the second switching signal to keep the second switch open. The controller is further configured to, change, at the third time, the first switching signal to open the first switch, discharge, from the third time to a fourth time, the second capacitor and the third capacitor to generate a third current flowing through the primary winding, and maintain, from the third time to the fourth time, the second switching signal to keep the second switch open. For example, the system is implemented according to FIG. 3, FIG. 4, FIG. 5 and/or FIG. 6.

According to yet another embodiment, a system for regulating a power converter includes a signal generator configured to output a first switching signal to a first switch and a second switching signal to a second switch, the first switch being coupled to an auxiliary winding of a power converter, the second switch including a first switch terminal and a second switch terminal and being coupled to a primary winding of the power converter, the power converter further including a secondary winding. The signal generator is further configured to, maintain, from a first time to a second time, the first switching signal to keep the first switch closed, change, at the second time, the first switching signal to open the first switch, maintain, from the first time to a third time, the second switching signal to keep the second switch open, the third time being no earlier than the second time, and if a difference between a first voltage of the first switch terminal and a second voltage of the second switch terminal becomes zero at the third time, change the second switching signal to close the second switch. For example, the system is implemented according to FIG. 3, FIG. 4, FIG. 5 and/or FIG. 6.

In one embodiment, a method for regulating a power converter includes, generating a first switching signal and a second switching signal, sending the first switching signal to a first switch coupled to an auxiliary winding of a power converter, and sending the second switching signal to a second switch coupled to a primary winding of the power converter further including a secondary winding. The method further includes changing, at a first time, the second switching signal to open the second switch, maintaining, from the first time to a second time, the first switching signal to keep the first switch open, and changing, at the second time, the first switching signal to close the first switch. In addition, the method includes changing, at a third time, the first switching signal to open the first switch, maintaining, from the third time to a fourth time, the second switching signal to keep the second switch open, and changing, at the fourth time, the second switching signal to close the second switch. For example, the method is implemented according to FIG. 3, FIG. 4, FIG. 5 and/or FIG. 6.

In another embodiment, a method for regulating a power converter includes, generating a first switching signal and a second switching signal, sending the first switching signal to a first switch coupled to a first capacitor and an auxiliary winding of a power converter, the power converter further including a primary winding and a secondary winding, and sending the second switching signal to a second switch coupled to the primary winding of the power converter, the second switch being associated with a second capacitor, the primary winding being associated with a third capacitor. The method further includes charging, from a first time to a second time, the first capacitor in response to a first current flowing through the first switch, discharging, from the second time to a third time, the first capacitor to generate a second current flowing through the first switch, and maintaining, from the first time to the third time, the first switching signal to keep the first switch closed. In addition, the method includes maintaining, from the first time to the third time, the second switching signal to keep the second switch open, changing, at the third time, the first switching signal to open the first switch, discharging, from the third time to a fourth time, the second capacitor and the third capacitor to generate a third current flowing through the primary winding, and maintaining, from the third time to the fourth time, the second switching signal to keep the second switch open. For example, the method is implemented according to FIG. 3, FIG. 4, FIG. 5 and/or FIG. 6.

In yet another embodiment, a method for regulating a power converter includes, generating a first switching signal to a first switch and a second switching signal to a second switch, the first switch being coupled to an auxiliary winding of a power converter, the second switch including a first switch terminal and a second switch terminal and being coupled to a primary winding of the power converter, the power converter further including a secondary winding, maintaining, from a first time to a second time, the first switching signal to keep the first switch closed, and changing, at the second time, the first switching signal to open the first switch. Further, the method includes maintaining, from the first time to a third time, the second switching signal to keep the second switch open, the third time being no earlier than the second time, and if a difference between a first voltage of the first switch terminal and a second voltage of the second switch terminal becomes zero at the third time, changing the second switching signal to close the second switch. For example, the method is implemented according to FIG. 3, FIG. 4, FIG. 5 and/or FIG. 6.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for regulating a power converter, the system comprising:
    a controller configured to generate a first switching signal and a second switching signal;
    a first switch configured to receive the first switching signal, the first switch being coupled to an auxiliary winding of the power converter further including a primary winding and a secondary winding; and a second switch configured to receive the second switching signal and coupled to the primary winding of the power converter;

wherein the controller is further configured to:
change, at a first time, the second switching signal to open the second switch;
maintain, from the first time to a second time, the first switching signal to keep the first switch open; and
change, at the second time, the first switching signal to close the first switch;

wherein the controller is further configured to:
change, at a third time, the first switching signal to open the first switch;
maintain, from the third time to a fourth time, the second switching signal to keep the second switch open; and
change, at the fourth time, the second switching signal to close the second switch.

2. The system of claim 1 wherein the first switch is coupled to the auxiliary winding directly.

3. The system of claim 1 wherein the second switch is coupled to the primary winding directly.

4. The system of claim 1 wherein the first switch includes a first transistor.

5. The system of claim 4 wherein the first transistor is a field effect transistor.

6. The system of claim 4 wherein the second switch includes a second transistor.

7. The system of claim 6 wherein the second transistor includes a field effect transistor.

8. The system of claim 1 wherein:
the first switch includes a first field effect transistor; and
the second switch includes a second field effect transistor.

9. The system of claim 1 wherein the first switch is coupled to a first capacitor.

10. The system of claim 9 wherein if the first switch is closed,
the first capacitor is configured to be charged during a first time period; and
the first capacitor is configured to be discharged during a second time period, the second time period following the first time period.

11. The system of claim 1 wherein:
the second switch is associated with a second capacitor; and
the primary winding is associated with a third capacitor.

12. The system of claim 11 wherein:
the second capacitor includes a first parasitic capacitor of the second switch; and
the third capacitor includes a second parasitic capacitor of the primary winding.

13. The system of claim 11 wherein if the second switch is open,
the second capacitor and the third capacitor are configured to be charged during a first time period; and
the second capacitor and the third capacitor are configured to be discharged during a second time period, the second time period following the first time period.

14. A system for regulating a power converter, the system comprising:
a controller configured to generate a first switching signal and a second switching signal;
a first switch configured to receive the first switching signal, the first switch being coupled to a first capacitor and an auxiliary winding of the power converter, the power converter further including a primary winding and a secondary winding; and
a second switch configured to receive the second switching signal and coupled to the primary winding of the power converter, the second switch being associated with a second capacitor, the primary winding being associated with a third capacitor;

wherein the controller is further configured to:
charge, from a first time to a second time, the first capacitor in response to a first current flowing through the first switch;
discharge, from the second time to a third time, the first capacitor to generate a second current flowing through the first switch;
maintain, from the first time to the third time, the first switching signal to keep the first switch closed; and
maintain, from the first time to the third time, the second switching signal to keep the second switch open;

wherein the controller is further configured to:
change, at the third time, the first switching signal to open the first switch;
discharge, from the third time to a fourth time, the second capacitor and the third capacitor to generate a third current flowing through the primary winding; and
maintain, from the third time to the fourth time, the second switching signal to keep the second switch open.

15. The system of claim 14 wherein the controller is further configured to maintain, from the third time to the fourth time, the first switching signal to keep the first switch open.

16. The system of claim 14 wherein:
the second capacitor includes a first parasitic capacitor of the second switch; and
the third capacitor includes a second parasitic capacitor of the primary winding.

17. The system of claim 16 wherein the second capacitor consists of the first parasitic capacitor of the second switch.

18. The system of claim 16 wherein the third capacitor consists of the second parasitic capacitor of the primary winding.

19. The system of claim 16 wherein:
the second capacitor consists of the first parasitic capacitor of the second switch; and
the third capacitor consists of the second parasitic capacitor of the primary winding.

20. The system of claim 14 wherein:
the first current flows along a first direction;
the second current flows along a second direction; and
the first direction is different from the second direction.

21. The system of claim 20 wherein:
the controller is further configured to charge, during a time period, the second capacitor and the third capacitor in response to a fourth current flowing through the primary winding;
the third current flows along a third direction;
the fourth current flows along a fourth direction; and
the third direction is different from the fourth direction.

22. The system of claim 14 wherein the second switch includes a field effect transistor.

23. The system of claim 14 wherein:
the first switch includes a first field effect transistor; and
the second switch includes a second field effect transistor.

24. A system for regulating a power converter, the system comprising:
 a controller configured to generate a first switching signal and a second switching signal, send the first switching signal to a first switch, and send the second switching signal to a second switch, the first switch being coupled to an auxiliary winding of the power converter further including a primary winding and a secondary winding, the second switch being coupled to the primary winding;
 wherein the controller is further configured to:
  change, at a first time, the second switching signal to open the second switch;
  maintain, from the first time to a second time, the first switching signal to keep the first switch open; and
  change, at the second time, the first switching signal to close the first switch;
 wherein the controller is further configured to:
  change, at a third time, the first switching signal to open the first switch;
  maintain, from the third time to a fourth time, the second switching signal to keep the second switch open; and
  change, at the fourth time, the second switching signal to close the second switch.

25. The system of claim 24 wherein the second switch includes a field effect transistor.

26. The system of claim 24 wherein:
 the first switch includes a first field effect transistor; and
 the second switch includes a second field effect transistor.

27. A system for regulating a power converter, the system comprising:
 a controller configured to generate a first switching signal and a second switching signal, send the first switching signal to a first switch, and send the second switching signal to a second switch, the first switch being coupled to a first capacitor and an auxiliary winding of the power converter, the power converter further including a primary winding and a secondary winding, the second switch being coupled to the primary winding and associated with a second capacitor, the primary winding being associated with a third capacitor;
 wherein the controller is further configured to:
  charge, from a first time to a second time, the first capacitor in response to a first current flowing through the first switch;
  discharge, from the second time to a third time, the first capacitor to generate a second current flowing through the first switch;
  maintain, from the first time to the third time, the first switching signal to keep the first switch closed; and
  maintain, from the first time to the third time, the second switching signal to keep the second switch open;
 wherein the controller is further configured to:
  change, at the third time, the first switching signal to open the first switch;
  discharge, from the third time to a fourth time, the second capacitor and the third capacitor to generate a third current flowing through the primary winding; and
  maintain, from the third time to the fourth time, the second switching signal to keep the second switch open.

28. The system of claim 27 wherein the second switch includes a field effect transistor.

29. The system of claim 27 wherein:
 the first switch includes a first field effect transistor; and
 the second switch includes a second field effect transistor.

30. A method for regulating a power converter, the method comprising:
 generating a first switching signal and a second switching signal;
 sending the first switching signal to a first switch coupled to an auxiliary winding of a power converter;
 sending the second switching signal to a second switch coupled to a primary winding of the power converter further including a secondary winding;
 changing, at a first time, the second switching signal to open the second switch;
 maintaining, from the first time to a second time, the first switching signal to keep the first switch open;
 changing, at the second time, the first switching signal to close the first switch;
 changing, at a third time, the first switching signal to open the first switch;
 maintaining, from the third time to a fourth time, the second switching signal to keep the second switch open; and
 changing, at the fourth time, the second switching signal to close the second switch.

31. The method of claim 30, and further comprising maintaining, from the second time to the third time, the first switching signal to keep the first switch closed, the third time being after the second time.

32. A method for regulating a power converter, the method comprising:
 generating a first switching signal and a second switching signal;
 sending the first switching signal to a first switch coupled to a first capacitor and an auxiliary winding of a power converter, the power converter further including a primary winding and a secondary winding;
 sending the second switching signal to a second switch coupled to the primary winding of the power converter, the second switch being associated with a second capacitor, the primary winding being associated with a third capacitor;
 charging, from a first time to a second time, the first capacitor in response to a first current flowing through the first switch;
 discharging, from the second time to a third time, the first capacitor to generate a second current flowing through the first switch;
 maintaining, from the first time to the third time, the first switching signal to keep the first switch closed;
 maintaining, from the first time to the third time, the second switching signal to keep the second switch open;
 changing, at the third time, the first switching signal to open the first switch;
 discharging, from the third time to a fourth time, the second capacitor and the third capacitor to generate a third current flowing through the primary winding; and
 maintaining, from the third time to the fourth time, the second switching signal to keep the second switch open.

33. The method of claim 32, and further comprising maintaining, from the third time to the fourth time, the first switching signal to keep the first switch open.

34. A system for regulating a power converter, the system comprising:
 a signal generator configured to output a first switching signal to a first switch and a second switching signal to a second switch, the first switch being coupled to an auxiliary winding of a power converter, the second switch including a first switch terminal and a second switch terminal and being coupled to a primary winding of the power converter, the power converter further including a secondary winding;

wherein the signal generator is further configured to:
- maintain, from a first time to a second time, the first switching signal to keep the first switch closed;
- change, at the second time, the first switching signal to open the first switch;
- maintain, from the first time to a third time, the second switching signal to keep the second switch open, the third time being no earlier than the second time; and
- if a difference between a first voltage of the first switch terminal and a second voltage of the second switch terminal becomes zero at the third time, change the second switching signal to close the second switch.

35. The system of claim 34 is further configured to:
- generate, from the first time to a fourth time, a first current flowing through the first switch along a first direction;
- generate, from the fourth time to the second time, a second current flowing through the first switch along a second direction, the second direction being different from the first direction; and
- generate, at the second time, a third current flowing through the primary winding along a third direction in order to reduce the difference between the first voltage and the second voltage.

36. The system of claim 34 wherein the second switch includes a field effect transistor.

37. The system of claim 36 wherein the first switch terminal is a source terminal and the second switch terminal is a drain terminal.

38. The system of claim 34 wherein:
- the first switch includes a first field effect transistor; and
- the second switch includes a second field effect transistor.

39. The system of claim 34 wherein the third time is later than the second time.

40. A method for regulating a power converter, the method comprising:
- generating a first switching signal to a first switch and a second switching signal to a second switch, the first switch being coupled to an auxiliary winding of a power converter, the second switch including a first switch terminal and a second switch terminal and being coupled to a primary winding of the power converter, the power converter further including a secondary winding;
- maintaining, from a first time to a second time, the first switching signal to keep the first switch closed;
- changing, at the second time, the first switching signal to open the first switch;
- maintaining, from the first time to a third time, the second switching signal to keep the second switch open, the third time being no earlier than the second time; and
- if a difference between a first voltage of the first switch terminal and a second voltage of the second switch terminal becomes zero at the third time, changing the second switching signal to close the second switch.

* * * * *